Dec. 20, 1955 A. P. RASMUSSEN ET AL 2,727,705
PRESSURE SENSITIVE SYSTEMS AND APPARATUS
Filed Aug. 11, 1953 2 Sheets-Sheet 1
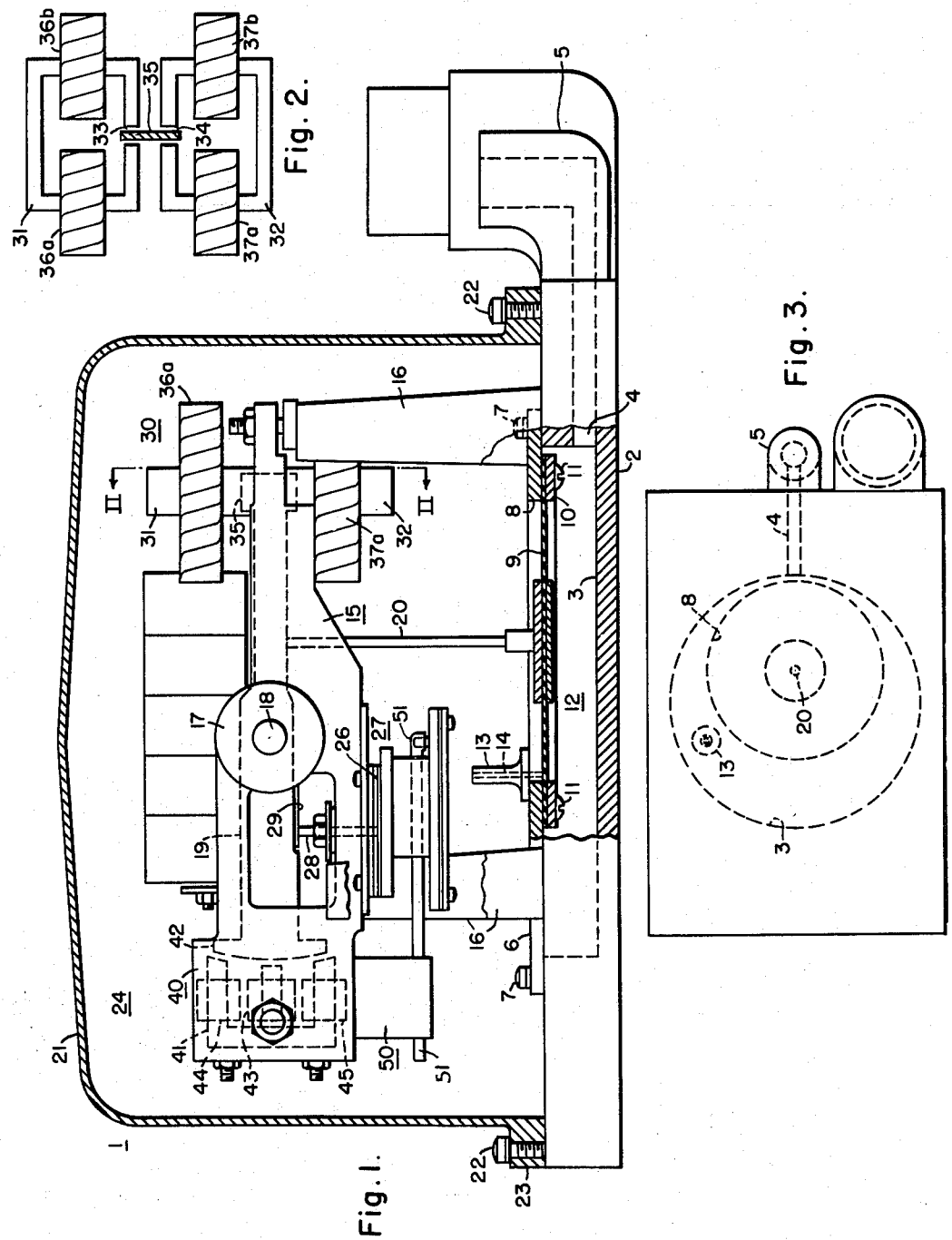
WITNESSES:
Robert C. Baird
E. F. Oberhein
INVENTORS
Arne P. Rasmussen &
David W. Roese.
BY
Paul E. Friedemann
ATTORNEY

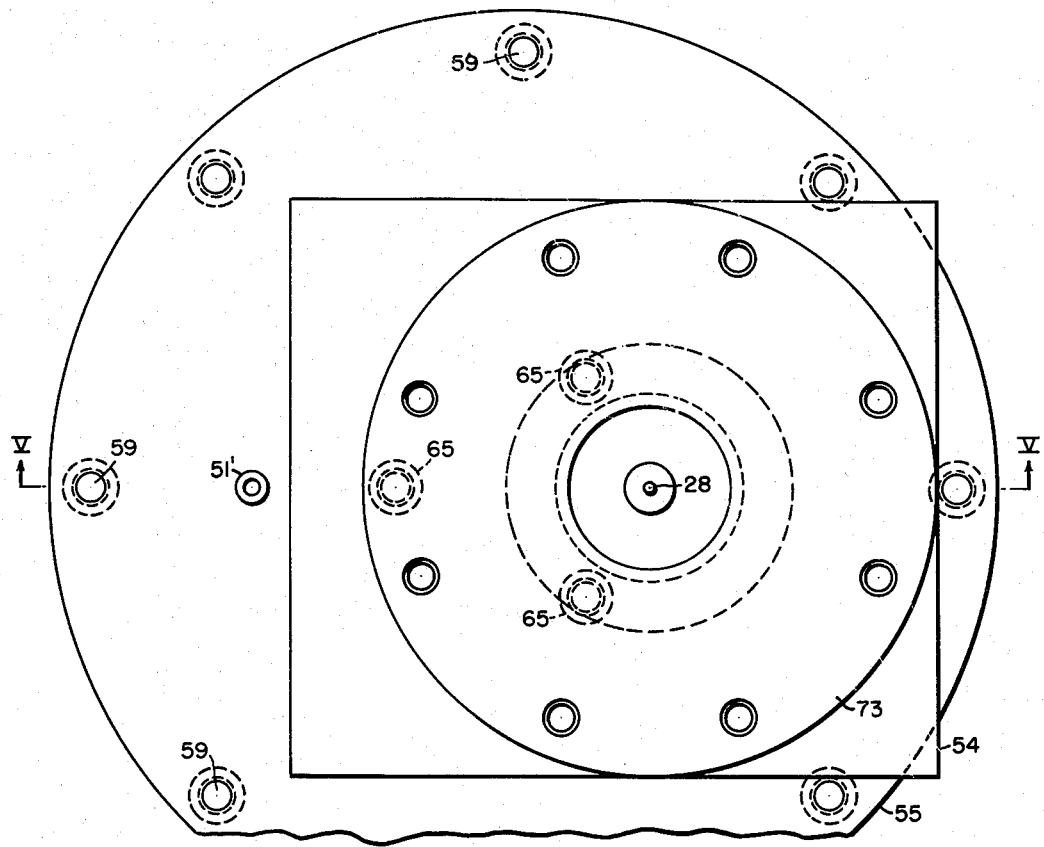
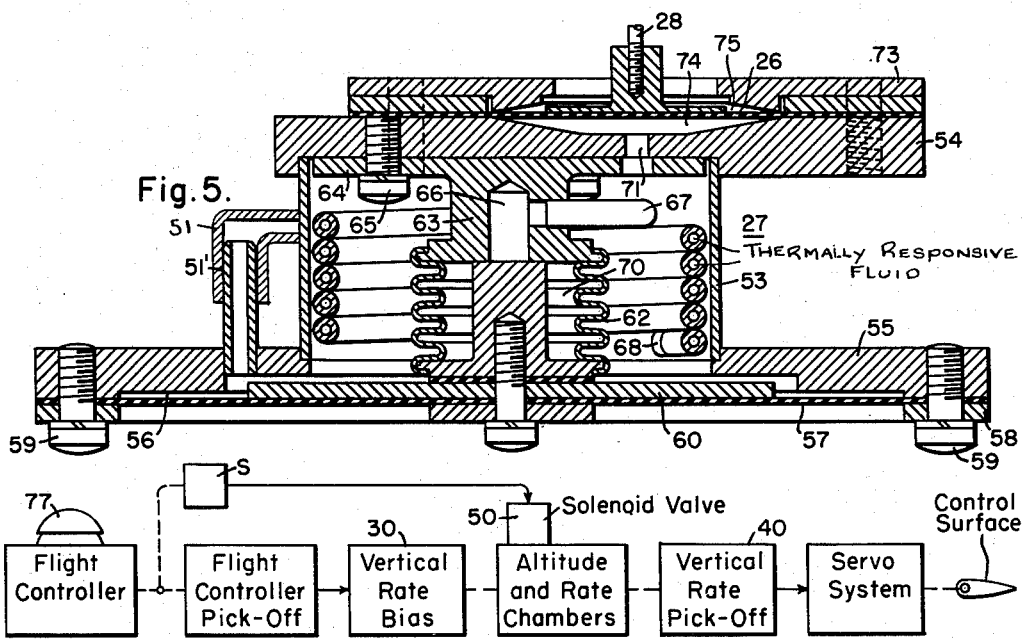

United States Patent Office 2,727,705
Patented Dec. 20, 1955

2,727,705
PRESSURE SENSITIVE SYSTEMS AND APPARATUS

Arne P. Rasmussen, Glen Burnie, and David W. Roese, Arbutus, Md., assignors to Westinghouse Electric Corporation, East Pittsburgh, Pa., a corporation of Pennsylvania Application August 11, 1953, Serial No. 373,648
22 Claims. (Cl. 244—77)

This invention relates generally to fluid pressure sensitive apparatus and to systems embodying such apparatus.

More particularly, this invention is directed to a device responsive to changes in air pressure and to rates of change of air pressure which is applicable in an altitude control system for an aircraft.

In the control of aircraft by means of automatic pilots, provision is usually made for maintaining the craft at a predetermined altitude in flight when the system is in the cruise mode of operation. Varieties of devices and systems have been proposed and utilized in this respect. In detecting altitude changes, some of these systems employ devices sensitive to changes in pitch attitude, which indicates in a certain degree a condition in which the altitude of the aircraft may change, and in other instances, pressure sensitive devices are employed such as sealed bellows which may be preloaded to be instrumental in maintaining a fixed altitude or are controlled by means of a valve so that air pressure at altitude may be trapped therein. In either case, the calibration is such that the bellows deflection or the bellows force is an indication of a change in altitude.

An improved system for maintaining aircraft at fixed altitude is disclosed in a copending application of Clinton R. Hanna et al., Serial No. 785,986, filed on November 14, 1947, entitled Gyroscope Control Systems and Apparatus for Controlling Dirigible Craft, and assigned to the assignee of this invention. This is now Patent 2,686,022.

In the aforesaid copending application, the altitude control comprises a pair of flexible, variable volume chambers, one chamber is controlled by a spring-opened solenoid-closed valve which is closed at a predetermined altitude to trap the air pressure at altitude in the chamber. The other flexible chamber called a rate chamber is provided with a restricted opening which permits a restricted flow of air into and out of the chamber in dependence of pressure differences appearing across the restricted opening. Each of these chambers is provided with a movable part, for example, a flexible diaphragm which is subject to air pressure. These diaphragms are connected by a mechanical linkage, the movement of which controls an electrical pickoff which in turn controls the elevator channel of the auto-pilot to thereby control the elevators. In this system, the altitude chamber functions as an absolute altitude reference and hence provides a sense which tends to return the aircraft to the predetermined altitude. The rate chamber responds to rates of change of pressure and, hence, of altitude, and the deflection of its diaphragm and the force of this diaphragm is indicative of the rate at which altitude is changing. This anticipation of altitude change provides a stimulus of such sense and magnitude for controlling the elevators of the aircraft as to minimize excursions of the aircraft in elevation. The combined effect of the diaphragm deflections, therefore, provides an improvement over existing controls while maintaining such advantages of the pressure sensitive system as have existed.

In a second copending application of Clinton R. Hanna et al., filed on the same date as this application, entitled Pressure Sensitive Systems and Apparatus, and assigned to the assignee of this invention, certain improvements over the invention claimed in the first-named application of Clinton R. Hanna et al. are claimed. Among these improvements reference is made to various arrangements whereby the sensitivity of the apparatus to excursions in ambient temperature may be minimized, and it is in this respect that the present application is related to the last-named copending application of Clinton R. Hanna et al.

One object of this invention is to provide a pressure sensitive apparatus which is simple with respect to operational requirements and positive in operation.

Another object of this invention is to provide a pressure sensitive apparatus which is compact, and which may be easily manufactured and assembled.

A further object of this invention is to provide a pressure sensitive apparatus of the character referred to in the preceding object in which response to changes in ambient temperature are minimized.

More specifically stated, it is an object of this invention to provide a pressure sensitive apparatus involving sealed chambers which are flexible in nature, wherein sensitivity to changes in ambient temperature is minimized by varying the sealed volume in correspondence with the temperature change.

Still more specifically stated, it is an object of this invention to provide a pressure sensitive apparatus embodying a chamber sealed by a flexible diaphragm, wherein means are provided for varying the volume of said chamber in dependence of expansion and contraction of a relatively incompressible fluid having a coefficient of thermal expansion.

It is also an object of this invention to provide an improved altitude rate control system for an aircraft.

The foregoing statements are merely illustrative of the various aims and objects of this invention. Other objects and advantages will become apparent upon a study of the following disclosure when considered in conjunction with the accompanying drawings, in which:

Figure 1 is a side view partially in section of a pressure sensitive apparatus embodying the principles of this invention;

Fig. 2 is a detail of the torque motor functioning as a biasing element in the assembly of Fig. 1;

Fig. 3 is a bottom view of the assembly of Fig. 1 drawn to a reduced scale;

Fig. 4 is a top view drawn to an enlarged scale of the altitude chamber assembly appearing in Fig. 1;

Fig. 5 is a sectional view taken on the line V—V of Fig. 4; and

Fig. 6 is a block diagram illustrating the application of this invention in a pitch channel system of an automatic pilot.

Referring to Figs. 1 through 4, the altitude rate control 1 comprises a base 2 having a recess 3 therein, which communicates through an opening 4 with a suitable fluid connector fitting 5 mounted at the edge of the base. Fluid connector 5 is adapted for connection to the static line of an aircraft. Recess 3, as will be seen by reference to Fig. 3, is of generally circular configuration and is covered by means of a plate 6 sealed about the marginal edge of the recess 3 and secured by means of screws 7 which pass through the plate and threadedly engage the base. Plate 6 is provided with an opening 8 therein which is sealed by a flexible diaphragm 9, the marginal edge of which around the opening 8 is secured by a clamping ring 10 fastened to the plate 6 by screws 11. The recess 3 and flexible diaphragm 9 together form a static chamber 12 to which the static pressure is admitted. A small fitting 13 having a capillary opening or orifice 14 therein is fitted in a suitable hole provided in plate 6 and communicates with the static chamber 12. The purpose of this will be apparent at a later point.

A support generally designated 15 is mounted at the upper end of a plurality of vertical supports 16. This support is provided with a journal 17 substantially centrally thereof which pivotally mounts a shaft 18 of a balanced beam 19 which functions as the force combining and transmitting member of the apparatus. Flexible diaphragm 9 is connected to the balanced beam 19 on the right side of its axis of pivoting, as seen in Fig. 1, by means of a rod 20. Thus, deflection of the diaphragm 9 due to pressure changes within the static chamber 12 is transmitted to the balanced beam 19 to apply a force thereto.

This assembly is enclosed within a cover 21 which is sealed to the top side of the base 2 about the plate 6 and forms an air-tight connection with the base. The cover is secured to the base by means of screws 22 which clear through flanges 23 on the cover and threadedly engage the base. The chamber 24 which is formed between the cover and the upper side of the base is referred to as the rate chamber, since the pressure therein due to the function of the capillary or orifice 14 is a function of the rate of change of pressure in the static chamber 12. Consequently, the force acting on the diaphragm 9 which is proportional to the pressure drop across the orifice 14 is proportional to the rate of change of pressure and, hence, of change in altitude of the aircraft.

In addition to the force proportional to the rate of change of pressure which is applied to the balanced beam 19, a force proportional to pressure is also applied thereto. This force is applied by an altitude diaphragm 26 forming part of an altitude control generally designated 27 which is mounted completely within the rate chamber 24 and thus follows the changing air pressure within the rate chamber to obtain an indication of a change in altitude. The purpose of mounting the altitude control within the rate chamber is to achieve time delay in the altitude sense corresponding to that of the altitude-rate sense. As described in the last-named copending application of Clinton R. Hanna, this is an important consideration, since the time delay in the rate sense at high altitudes may amount to as much as two to three seconds. The altitude control if mounted at some point exterior of the rate chamber so that its diaphragm were not subject to the pressure within the rate chamber but to the existing ambient pressure would therefore follow the change in ambient pressure with considerably less delay than the rate sensing means. In some applications, this character of response to the two pressure characteristics may be objectionable. Consequently, it is preferred that the altitude control be positioned such that the diaphragm thereof be subject to the pressure within the rate chamber. The rate chamber and the altitude chamber each having flexible diaphragms may be referred to as flexible chambers. Bellows type chambers may also be employed. However, the structural configuration of the flexible chambers herein employed inheres practical advantages which are presently preferred.

The altitude diaphragm 26 is connected to the balanced beam 19 on the left side of the pivot axis by means of a rod 28, the upper end of which is coupled to the balanced beam through a loaded spring assembly 29 which is only partially seen. Details of this spring assembly which is provided for the purpose of limiting the torques applied to the balanced beam by the altitude diaphragm may be had by reference to the last-named copending application of Clinton R. Hanna. The idea in limiting the torques due to altitude diaphragm deflection is to prevent excessive corrections in pitch attitude if for any reason the vertical displacement from altitude should become large, thus minimizing the possibility of forcing the aircraft into a pitch attitude which could result in a stall or producing abrupt changes in pitch attitude. The details of the altitude control will be discussed at a later point in this application.

Movement of the balanced beam 19 about pivot 18 is further controlled by means of a torque motor generally designated 30. Torque motor 30 comprises a pair of oppositely disposed C-shaped core members, respectively designated 31 and 32. Each core is provided with an air gap between the confronting core extremities. These air gaps are respectively designated 33 and 34. Respective cores 31 and 32 are mounted one above the other as seen in Fig. 1 at the right end of the balanced beam 19, and are supported in this position upon the support 15 by suitable means (not shown). When mounted in this position, the air gaps 33 and 34 are so aligned as to receive an armature 35 which is of the shape of a flat plate and which is mounted at the right end of the balanced beam 19. As will be seen by reference to Fig. 2, armature 35 extends through both air gaps 33 and 34 in closely spaced relation with the core faces defining the air gaps. The armature is arranged for linear movement through the respective air gaps without changing the air gap dimensions whenever the balanced beam 19 tilts about pivot 18. Cores 31 and 32 are provided with respective pairs of coils 36a, 36b and 37a, 37b, which are arranged on oppositely disposed sections of the respective cores. These coils are adapted for excitation with either alternating current or direct current depending upon the application in such sense that the respective magnetomotive forces are in series aiding relation around the respective magnetic circuits.

As will be explained hereinafter, the coils of the torque motor 30 may be energized by the electrical output of a flight controller or other suitable device in such a way as to unbalance the total excitation of the respective pairs of coils. By this expedient, the flux density in one core may be increased while the flux density in the other core is decreased. This unbalances the opposed magnetic forces acting across the armature 35 tending to pull the armature in the direction of the higher flux density. The movement of the armature is guided by the balanced beam through the respective air gaps. Since no change in gap dimension occurs with this movement, but only a change in the magnetic mass within and adjacent the air gap occurs, the magnetic pull acting on the armature is a linear function of coil current, and hence is linear with respect to the command signal which originates at the flight controller.

Pivotal movement of the balanced beam 19 is detected by means of an electrical pickoff generally designated 40 which is disposed at the left end of the balanced beam as seen in Fig. 1. Any suitable type of electrical pickoff may be utilized depending upon the application. That herein illustrated is generally known in the art as a E–I type of pickoff. This pickoff comprises a generally E-shaped core 41 indicated in dotted outline which is supported at the left end of the stationary support 15. This core includes three legs, the ends of which terminate along the surface of an arc having its center at the axis of pivot 18. A moving armature 42 indicated in dotted outline and comprised of a suitable magnetic material is disposed at the left end of the balanced beam 19 and is provided with an arcuate surface also having its center at the axis of pivot 18 and radially spaced from the extremities of the three legs of the core 41.

Hence, as in the case of the torque motor, but by different means, and stated differently, an overlapping gap relationship between the armature and the core of the pickoff is provided in which displacement of the armature 42, guided by the balanced beam 19, changes only the area of the confronting faces of the respective air gaps between the armature and the outer core legs, but does not change the radial gap dimensions. As a consequence, the change in flux in the core is due only to the change in gap area and is therefore a linear function of the magnetizing current. A magnetizing coil 43 is mounted on the center leg of the core and produces fluxes which flow through the respective outer legs linking the armature across the outer radial air gaps and returning to the core from the armature through the radial air gap at the center leg of the core to complete the magnetic circuit. Respective secondary windings 44 and 45 are provided on the outer legs of the core, and consequently are linked by the fluxes flowing in the associated outer legs. Thus, angular displacement of the armature 42 with respect to the core oppositely varies the fluxes in the outer legs and correspondingly varies the voltages which are induced in the respective secondary coils. The differential of the secondary voltages is utilized to control the pitch servo system of the automatic pilot.

The function of the arrangement as described to this point is essentially as follows: Assuming an increase in pressure due for instance to a drop in altitude of the aircraft, the static pressure admitted to the static chamber 12 increases forcing the rate diaphragm 9 upwardly. This tilts the balanced beam 19 in a counterclockwise direction about pivot 18 displacing the armature 42 in a direction to increase the gap area by further overlapping of the confronting gap faces at the lower core leg while decreasing the gap area at the upper core leg, which unbalances the voltages of the coils 44 and 45, the direction of unbalance being in favor of coil 45 which is now linked by flux of higher density than that of coil 44. The pressure within the rate chamber 24 tends to follow the increase in pressure in the static chamber 12, and assuming that the control effect has been such as to check the rate of change of pressure resulting from decreasing altitude by leveling-off the aircraft, the pressure within the rate chamber will shortly tend to become equal to that in the static chamber which approaches a constant value as leveling-off occurs.

But under this condition, the pressure within the altitude chamber 27 is lower than that in the rate chamber 24. Consequently, the altitude diaphragm 26 is displaced inwardly and pulls downwardly on the rod 28 which in turn tends to maintain the counterclockwise angular tilting of the balanced beam 19. The control stimulus by the altitude-rate control pickoff on the elevator servo system therefore remains, and consequently the aircraft begins to return to its original elevation indicated by the air pressure within the altitude chamber. At this time, however, the rate of change of pressure is reversed from that which existed when the aircraft lost altitude, and the pressure within the rate chamber 24 exceeds that in the static pressure chamber 12. The pressure differential across the orifice 14 is therefore reversed tending to force the rate diaphragm 9 downwardly as viewed which introduces a clockwise torque on the balanced beam 19 which opposes the torque due to the action of the altitude diaphragm. These two torques diminish at the time the aircraft is leveled-off at the proper elevation and in this interval the rate diaphragm functions as a damper tending to bring the aircraft smoothly back to the proper elevation with a minimum of hunting of the elevation or altitude indicated by the pressure in the altitude chamber.

Means are provided for controlling the pressure in the altitude chamber to maintain the aircraft at any particularly selected altitude. This means is represented in block outline in Fig. 1 and comprises a solenoid valve generally designated 50. The details of this valve are not shown since they are conventional, but reference may be had to the aforesaid patent to Hanna et al. for details of an operable arrangement. Solenoid valve 50 controls the tubular conductor 51 communicating between the altitude chamber 27, by means of nipple 51', and the rate chamber 24. As a general proposition, valve 50 may be spring opened and solenoid closed for one particular mode of operation, and the energization of the solenoid may be controlled by a detent on the flight controller in a manner described in the first-named copending application of Clinton R. Hanna et al.

With this arrangement, when the flight controller is in neutral position, the detent operated switch is open. Consequently, the solenoid is deenergized and the spring biases the solenoid valve to closed position which seals the altitude chamber. The pressure in the altitude chamber at the time the spring closes the valve is, of course, the pressure which existed in the rate chamber 24, which except under high rates of climbing and diving, will correspond essentially to the static pressure at that altitude.

It will be appreciated that the pressure within the altitude chamber will vary depending upon the ambient temperature increasing and decreasing in direct proportion thereto. As pointed out in the last mentioned copending application of Clinton R. Hanna, several expedients may be practiced for compensating or overcoming this sensitivity to temperature which disturbs the calibration of the device. The two methods named in that application were space heating of the area within the rate chamber 24 by means of a small thermostatically controlled electric heater having sufficient capacity to maintain the temperature within the chamber at a higher level than any ambient temperature normally encountered in the operating environment of the device, and the expedient of compensating pressure changes due to ambient temperature changes by varying the volume of the altitude chamber as a function of temperature. This last-named expedient is practiced in the present arrangement in an improved way.

The enlarged details of the altitude chamber are illustrated in Figs. 4 and 5 showing, respectively, top and section views of the chamber. As will be seen by reference to Fig. 5, the altitude chamber 27 is defined by a cylinder 53 which is sealed at its upper end in a recess in plate 54 and at its bottom end is sealed about an opening in plate 55. The bottom face of the plate 55 is provided with a recess 56 over which a relatively stiff volume compensating diaphragm 57 is sealed by means of a clamping ring 58 secured by screws 59. A center plate 60 which is secured to the volume compensating diaphragm 57 is connected to one end of a flexible bellows 62, the upper end of which is connected to a stationary fitting 63 having a flange 64 secured to the bottom side of plate 54 by screws 65. Fitting 63 is provided with an opening 66 communicating with the bellows and which receives one end of a helically wound tube 67 which is disposed about the bellows 62. The other end of tube 67 is sealed at 68 to prevent fluid from escaping therefrom. The bellows and the tube are completely filled with a relatively incompressible fluid 70 having a coefficient of thermal expansion such that an increase in temperature increases the volume of the fluid and thereby causes the bellows to be axially extended to drive the diaphragm 57 downwardly, as viewed, increasing the volume within the altitude chamber 27 as the temperature increases so that the fluid pressure within the chamber remains substantially constant. The converse of this function takes place, of course, when the ambient temperature drops, which causes the fluid filling the bellows and the tube to contract. The altitude chamber communicates with the altitude diaphragm 26 through an opening 71 extending through the flange 64 and through the plate 54 which carries the altitude diaphragm. The altitude diaphragm is secured in fluid-tight relation to the plate 54 by a clamping ring assembly generally designated 73.

Provision is made in this assembly to prevent damage to the altitude diaphragm by excessive deflection in the presence of large pressure changes by providing cavities 74 and 75 in the upper face of plate 54 and in the bottom face of ring assembly 73 respectively. These cavities are provided with sides of relatively shallow slope which engage and support the altitude diaphragm in each of its two extremes of deflection and prevent further movement thereof in the presence of increasing pressure. This rigid mechanical support of the diaphragm prevents it from being overstressed and permanently distorted or broken in the presence of abnormal pressure conditions.

Tube 67 is relatively rigid and any deflection which takes place in the presence of pressure changes therewithin due to temperature excursions is of a secondary nature. Thus, the volume of the temperature compensating assembly is relatively unaffected in this respect. The object of providing the tubular assembly within the altitude chamber is that of distributing the temperature sensitive fluid medium throughout the chamber so that the average ambient temperature is sensed by the fluid. It will be appreciated, however, that satisfactory temperature response in many instances may be obtained without the expedient of the tube. It is to be understood that this invention is not limited in that respect.

By making the volume controlling diaphragm 57 of relatively stiff material, the volume compensating feature is essentially mechanically self-sustaining and substantially unresponsive to changes in ambient pressure. As a consequence, the primary response to ambient pressure changes is at the altitude diaphragm 26 and the primary control of the volume of the altitude chamber is at the volume controlling diaphragm 57 which, it will be noted, is quite large with respect to the altitude diaphragm so that slight displacements thereof produce appreciable volume changes in the altitude chamber.

The application of this invention in a flight control system for controlling the elevator control surfaces of an aircraft appears in Fig. 6. In the interest of simplicity only such features directly related to the pressure sensitive altitude-rate control of this invention are illustrated therein. System details may be obtained by reference to U. S. Patent 2,638,288 of Clinton R. Hanna, which is assigned to the assignee of this invention. In the arrangement illustrated in Fig. 6, a flight controller having a hand-operated control knob 77 is provided with an electrical pickoff of any suitable type, for example, a potentiometer having a movable tap driven by angular displacement of the flight controller. The output of this electrical pickoff is applied, for example, through the expedient of a bridge circuit (not shown) to the biasing system of the altitude-rate control represented in the torque motor generally designated 30 in Fig. 1. The mechanical connection of the torque motor to the altitude and rate chambers through the medium of the balanced beam 19 in Fig. 1 is represented in Fig. 6 by a dotted line, and the further connection of the outputs of the altitude and rate chambers to the altitude rate pickoff through the balanced beam 19 is represented in a dotted connection between the altitude and rate chambers and the altitude-rate pickoff in Fig. 6. The electrical connection between the altitude-rate pickoff designated 40 and the elevator servo system is represented by the arrow therebetween. The servo system is mechanically connected to drive the control surface.

Assuming that the aircraft is being maneuvered from the flight controller, as long as the control knob 77 is out of detent or neutral position, the switch S, which is mechanically connected through a suitable detent to the flight controller, will remain closed, and, consequently, the solenoid valve 50 will be energized to open the altitude chamber to the pressure within the rate chamber. Consequently, when a change in pitch attitude is commanded at the flight controller, this valve will be open and the pressure within the altitude chamber will follow the pressure in the rate chamber.

When the flight controller is displaced, the electrical output of its pickoff energizes the torque motor 30 which biases the balanced beam assembly in such sense as to produce an electrical output at the altitude-rate pickoff device 40 to cause the aircraft to follow the movement of the flight controller. The actual position of the flight controller at any instant, with the present arrangement, indicates a particular rate of climb or dive and this rate is established by the function of the rate diaphragm which, acting alone under this condition, introduces a fluid pressure torque on the balanced beam 19, due to the pressure drop across orifice 14 with the changing condition of altitude, which opposes the magnetic torque introduced by the torque motor 30. The displacement of the knob at the flight controller therefore indicates a rate of change of elevation which is controlled and regulated by the rate system and maintains the aircraft at the desired rate of climb or dive as long as the flight controller position or displacement is maintained. The aircraft may be leveled off by returning the flight controller to neutral or detent position which deenergizes and closes the solenoid valve. Centering of the flight controller removes the command signal from the torque motor 30 and, hence, removes the magnetic torque from the balanced beam 19. The remaining torque, therefore, is due only to the rate diaphragm 9 which as described opposed the magnetic torque of the torque motor. The pressure rate bias acting on the elevator servo system, therefore, establishes an effective control tending to reduce the rate of change of pressure to zero by leveling-off the craft. The particular altitude at which the craft will remain, of course, depends upon the pressure in the now sealed altitude chamber 27.

Although but one embodiment of this invention has been herein described, it will be appreciated that this invention is susceptible of modification in numerous of its details and in the organization of such details. Accordingly, it is intended that the foregoing disclosure and the showings made in the drawings shall be construed only as illustrative of the principles of this invention and not interpreted in a limiting sense.

We claim as our invention:

1. Pressure sensitive apparatus comprising, a first flexible chamber having a restricted opening therein, a sealed flexible chamber disposed within said first chamber, each of said chambers having a part which moves in response to variations in fluid pressure, means connected to both of said parts to respond to movement thereof, a second movable part on said sealed chamber for varying the volume thereof, a sealed expandable-contractable chamber connected to said second movable part to displace said second movable part and vary the volume of said sealed chamber, and a fluid having a temperature coefficient of expansion filling said expandable-contractable chamber.

2. Gas pressure sensitive apparatus adapted for immersion in a gaseous medium the pressure of which is to be detected comprising, a sealed gas filled chamber having a movable part subject to the pressure of said gaseous medium for indicating gas pressure changes, a second movable part forming part of the volume of said chamber, a sealed expandable-contractable chamber having a fixed end and a movable end connected to said second movable part to displace said second movable part and vary the volume of said sealed chamber, and a liquid having a temperature coefficient of expansion filling said expandable-contractable chamber, said liquid expanding with increasing temperature and displacing the end of said expendable-contractible chamber connected to said second movable part to increase the volume of said gas filled chamber to prevent the pressure therein from changing with temperature.

3. Gas pressure sensitive apparatus adapted for immersion in a gaseous medium the pressure of which is to be detected comprising, a sealed gas filled chamber having a movable part subject to the pressure of said gaseous medium for indicating gas pressure changes by its displacement, a second movable part forming part of the volume of said chamber, a sealed bellows arrangement having one end fixed and the other end connected to said second movable part, and a liquid having a temperature coefficient of expansion filling said sealed bellows arrangement, said liquid expanding with increasing temperature and displacing the end of said bellows connected to said second movable part to increase the volume of said gas filled chamber to prevent the pressure therein from changing with temperature.

4. Gas pressure sensitive apparatus adapted for immersion in a gaseous medium the pressure of which is to be detected comprising, a sealed gas filled chamber having a first movable part subject to the pressure of said gaseous medium, a second movable part forming part of the volume of said chamber, a sealed bellows arrangement having one end fixed and the other end connected to said second movable part, a liquid having a temperature coefficient of expansion filling said bellows arrangement, said liquid expanding with increasing temperaure and displacing the end of said bellows connected to said second movable part to increase the volume of said chamber to prevent the pressure therein from changing with temperature, and means responsive to movement of said first movable part.

5. Gas pressure sensitive apparatus adapted for immersion in a gaseous medium the pressure of which is to be detected comprising, a sealed gas filled chamber having a first movable part subject to the pressure of said gaseous medium, a second movable part forming part of the volume of said chamber, a sealed bellows arrangement having one end fixed and the other end connected to said second movable part, a liquid having a temperature coefficient of expansion filling said bellows arrangement, said liquid expanding with increasing temperature and displacing the end of said bellows connected to said second movable part to increase the volume of said chamber to prevent the pressure therein from changing with temperature, and an electrical pickoff having a movable input member mechanically connected to said first movable part.

6. Gas pressure sensitive apparatus adapted for immersion in a gaseous medium the pressure of which is to be detected comprising, a sealed gas filled chamber having a first movable part subject to the pressure of said gaseous medium, a second movable part forming part of the volume of said chamber, a sealed bellows arrangement having one end fixed and the other end connected to said second movable part, a liquid having a temperature coefficient of expansion filling said bellows arrangement, said liquid expanding with increasing temperature and displacing the end of said bellows connected to said second movable part to increase the volume of said chamber to prevent the pressure therein from changing with temperature, an electrical pickoff having a movable input member, a movable support connecting said movable input member to said first movable part of said chamber to be displaced thereby, and means associated with said movable support for causing displacement thereof independently of said first movable part.

7. Gas pressure sensitive apparatus adapted for immersion in a gaseous medium the pressure of which is to be detected comprising, a sealed gas filled chamber having a first movable part subject to the pressure of said gaseous medium, a second movable part forming part of the volume of said chamber, a sealed bellows arrangement having one end fixed and the other end connected to said second movable part, a liquid having a temperature coefficient of expansion filling said bellows arrangement, said liquid expanding with increasing temperature and displacing the end of said bellows connected to said second movable part to increase the volume of said chamber to prevent the pressure thereing from changing with temperature, an electrical pickoff having a movable input member, a movable support connecting said movable input member to said first movable part of said chamber to be displaced thereby, and an electromagnetic device disposed in flux linkage with a magnetizable portion of said movable support for causing displacement of said movable support.

8. Pressure sensitive apparatus comprising, a sealed chamber having a first movable part subject to fluid pressure for indicating pressure changes, a second movable part forming part of the volume of said chamber, a bellows disposed within said chamber and having one end secured against movement and the other end connected to said second movable part to cause displacement thereof, a tube distributed within said chamber and having one end sealed and the other end connected to said bellows to communicate therewith, and a fluid having a coefficient of thermal expansion filling said bellows and said tube.

9. Pressure sensitive apparatus comprising, a sealed chamber having a first movable part subject to fluid pressure for indicating pressure changes, a second movable part forming part of the volume of said chamber, a bellows disposed within said chamber and having one end secured against movement and the other end connected to said second movable part to cause displacement thereof, a helically wound tube disposed within said tube about said bellows, one end of said tube being sealed and the other end connecting with said bellows to communicate therewith, and a fluid having a coefficient of thermal expansion filling said bellows and said tube.

10. Pressure sensitive apparatus comprising, a sealed chamber having a first movable part subject to fluid pressure, a second movable part forming part of the volume of said chamber, a bellows disposed within said chamber and having one end secured against movement and the other end connected to said second movable part to cause displacement thereof, a tube distributed within said chamber, one end of said tube being sealed and the other end connecting with said bellows to communicate therewith, a fluid having a coefficient of thermal expansion filling said bellows and said tube, and means connected with said first movable part to respond to displacement thereof.

11. Pressure sensitive apparatus comprising, a sealed chamber having a first movable part subject to fluid pressure, a second movable part forming part of the volume of said chamber, a bellows disposed within said chamber and having one end secured against movement and the other end connected to said second movable part to cause displacement thereof, a tube distributed within said chamber, one end of said tube being sealed and the other end connecting with said bellows to communicate therewith, a fluid having a coefficient of thermal expansion filling said bellows and said tube, an electrical pickoff having a movable input member, and means connecting said movable input member to said first movable part of said chamber.

12. Pressure sensitive apparatus comprising, a sealed chamber having a first movable part subject to fluid pressure, a second movable part forming part of the volume of said chamber, a bellows disposed within said chamber and having one end secured against movement and the other end connected to said second movable part to cause displacement thereof, a tube distributed within said chamber, one end of said tube being sealed and the other end connecting with said bellows to communicate therewith, a fluid having a coefficient of thermal expansion filling said bellows and said tube, an electrical pickoff having a movable input member, a movable support connecting said movable input member to said first movable part of said chamber, a magnetizable section on said movable support, and electromagnetic means disposed in flux linkage with said magnetizable section.

13. Pressure sensitive apparatus comprising, a first chamber having an opening therein, a flexible diaphragm sealing said opening, means forming a restricted opening into said first chamber, a second chamber having a pair of openings therein, an output flexible diaphragm sealing one opening in said second chamber, a volume control diaphragm sealing the other opening in said second chamber, an expandable-contractable device connected with said volume controlling diaphragm to cause displacement thereof, a fluid having a coefficient of thermal expansion filling said expandable-contractable device, and means connected with the flexible diaphragm of said first chamber and with the output flexible diaphragm of said second chamber to respond to the displacements thereof.

14. Pressure sensitive apparatus comprising, a base having a recess therein, a diaphragm sealed over said recess, said base having an opening therein into said recess for admitting fluid pressure, a casing sealed to said base about said diaphragm and forming a chamber with said base, means providing a restricted opening between said recess and said chamber, a sealed chamber mounted within said first named chamber and having a pair of diaphragms, one an output diaphragm and the other a volume compensating diaphragm, a sealed bellows assembly having one end connected to said volume compensating diaphragm and the other end being stationarily secured, a fluid having a coefficient of thermal expansion filling said bellows assembly, and means connected to said diaphragm sealing said recess and to said output diaphragm of said sealed chamber to respond to the displacements thereof.

15. Pressure sensitive apparatus comprising, a base having a recess therein, a diaphragm sealed over said recess, said base having an opening therein into said recess for admitting fluid pressure, a casing sealed to said base about said diaphragm and forming a chamber with said base, means providing a restricted opening between said recess and said chamber, a sealed chamber mounted within said first named chamber and having a pair of diaphragms, one an output diaphragm and the other a volume compensating diaphragm, a sealed bellows assembly having one end connected to said volume compensating diaphragm and the other end being stationarily secured, a fluid having a co-efficient of thermal expansion filling said bellows assembly, a movable member connected to said diaphragm sealing said recess and to said output diaphragm of said sealed chamber, an electrical pickoff device mounted within said first named chamber, and a movable input element for said pickoff device connected to said movable member.

16. Pressure sensitive apparatus comprising, a base having a recess therein, a diaphragm sealed over said recess, said base having an opening therein into said recess for admitting fluid pressure, a casing sealed to said base about said diaphragm and forming a chamber with said base, means providing a restricted opening between said recess and said chamber, a sealed chamber mounted within said first named chamber and having a pair of diaphragms, one an output diaphragm and the other a volume compensating diaphragm, a sealed bellows assembly having one end connected to said volume compensating diaphragm and the other end being stationarily secured, a fluid having a coefficient of thermal expansion filling said bellows assembly, a movable member connected to said diaphragm sealing said recess and to said output diaphragm of said sealed chamber, an electrical pickoff device mounted within said first named chamber, a movable input element for said pickoff device connected to said movable member, a magnetic section on said movable member, and electromagnetic means disposed in flux linkage with said magnetic section.

17. Apparatus as set forth in claim 14 in which said bellows assembly comprises a bellows and a tube distributed within said sealed chamber, one end of said tube being sealed and the other end connecting with said bellows and forming with the bellows the volume of said bellows assembly filled wiht said fluid having a coefficient of thermal expansion.

18. Apparatus as set forth in claim 14 in which said bellows assembly comprises a bellows and a helical tube disposed about said bellows, one end of said tube being sealed and the other end connecting with said bellows and forming with said bellows the volume of said bellows assembly filled with said fluid having a coefficient of thermal expansion.

19. Pressure sensitive apparatus comprising, a base having a recess therein, a diaphragm sealed over said recess, said base having an opening therein into said recess for admitting fluid pressure, a casing sealed to said base about said diaphragm and forming a chamber with said base, means providing a restricted opening between said recess and said chamber, a sealed chamber mounted within said first named chamber and having a pair of diaphragms, one an output diaphragm and the other a volume compensating diaphragm, a sealed bellows assembly having one end connected to said volume compensating diaphragm and the other end being stationarily secured, a fluid having a coefficient of thermal expansion filling said bellows assembly, a pivotally mounted member disposed within said first named chamber, means connecting said diaphragm sealing said recess to said pivotally mounted member on one side of the axis of pivoting thereof, means connecting said output diaphragm of said sealed chamber to said pivotally mounted member in opposition to said diaphragm sealing said recess, an electrical pickoff having an input element connected to said pivotally mounted bar at a point displaced from the pivot axis thereof, and a torque motor having an output member connected to said pivotally mounted bar.

20. Apparatus as recited in claim 19 in which said torque motor comprises at least one core having an air gap therein and a coil on said core, said output element being of magnetic material and moving through said air gap.

21. Apparatus as set forth in claim 19 in which said electrical pickoff comprises an E-shaped core having a magnetizing winding on the center leg and pickoff windings on the outer legs, the ends of said legs lying along the surface of an arc having its center at the pivot axis of said pivotally mounted bar, said input member comprising a magnetic section having an arcuate face straddling the ends of said three legs and being radially spaced therefrom.

22. Flight control apparatus for controlling a control surface of an aircraft comprising, a rate chamber having a movable part subject to air pressure variations and having an airflow restricting opening therein permitting airflow therethrough at limited volume rates with variations in air pressure, a sealed chamber having a first movable part subject to air pressure and having a second movable part for varying the volume of said sealed chamber, an expandable-contractable device having one end stationarily secured and the other end connected to said second movable part to effect displacement thereof to vary the volume of said sealed chamber, means for expanding and contracting said device comprising a fluid filling said device, said fluid having a coefficient of thermal expansion, an electrical pickoff having a movable input member connected to and controlled by said movable part of said rate chamber and said first movable part, and electrically controlled booster system connected to said control surface to drive said control surface, circuit means connecting said electrical pickoff to said electrically controlled booster system, electromagnetic biasing means having an output member connected to said input member to cause movement thereof and a flight controller having an electrical output circuit connected to said electromagnetic biasing means for controlling movement of the output member thereof.

References Cited in the file of this patent
UNITED STATES PATENTS

| | | |
|---|---|---|
| 897,730 | Fulton | Sept. 1, 1908 |
| 2,159,703 | Koch | May 23, 1939 |
| 2,358,803 | Hanson et al. | Sept. 26, 1944 |
| 2,445,335 | Philbrick et al. | July 20, 1948 |
| 2,479,307 | Camilli et al. | Aug. 16, 1949 |
| 2,526,669 | Kellogg II et al. | Oct. 24, 1950 |
| 2,568,226 | Drake | Sept. 18, 1951 |
| 2,638,288 | Hanna | May 12, 1953 |
| 2,652,859 | Murphy | Sept. 22, 1953 |